United States Patent
Bromley et al.

(10) Patent No.: US 7,455,914 B2
(45) Date of Patent: Nov. 25, 2008

(54) PREFORM, INTERMEDIATE ARTICLE AND METHOD FOR MANUFACTURING A BLOWN FINISH CONTAINER

(75) Inventors: Mark Bromley, York, PA (US); Paul Kelley, Thurmont, MD (US)

(73) Assignee: Graham Packaging Company, L.P., York, PA (US)

(*) Notice: Subject to any disclaimer, the term of this patent is extended or adjusted under 35 U.S.C. 154(b) by 107 days.

(21) Appl. No.: 10/910,710

(22) Filed: Aug. 3, 2004

(65) Prior Publication Data

US 2005/0008888 A1 Jan. 13, 2005

Related U.S. Application Data

(62) Division of application No. 10/034,410, filed on Dec. 27, 2001, now Pat. No. 6,814,923.

(51) Int. Cl.
B29D 22/00 (2006.01)
B29D 23/00 (2006.01)
B32B 1/08 (2006.01)

(52) U.S. Cl. .................. 428/542.8; 428/35.7; 428/36.9

(58) Field of Classification Search ................ 428/35.7, 428/36.92, 542.8, 36.9; 264/536–538, 161; 425/527, 528, 533, 806; 82/101; 83/914
See application file for complete search history.

(56) References Cited

U.S. PATENT DOCUMENTS

| | | | |
|---|---|---|---|
| 3,124,273 A * | 3/1964 | Remington et al. ........... 222/92 |
| 3,675,521 A | 7/1972 | Ziegler .......................... 82/101 |
| 3,846,531 A * | 11/1974 | Reilly .......................... 264/161 |
| 3,899,096 A * | 8/1975 | Marco .......................... 215/42 |
| 4,305,904 A | 12/1981 | Black .......................... 264/536 |
| 4,361,531 A | 11/1982 | Black .......................... 264/161 |
| 4,445,406 A | 5/1984 | Thatcher ........................ 82/46 |
| 4,496,064 A | 1/1985 | Beck et al. .................. 215/1 C |
| 4,539,463 A * | 9/1985 | Piccioli et al. ......... 219/121.67 |
| 4,576,843 A | 3/1986 | Beck et al. .................... 428/35 |
| 4,618,515 A | 10/1986 | Collette et al. ................ 428/35 |
| 4,665,682 A | 5/1987 | Kerins et al. .................. 53/452 |
| 4,876,930 A | 10/1989 | Thatcher ........................ 82/46 |
| 4,894,268 A * | 1/1990 | Greenwood et al. ...... 428/36.92 |
| 5,257,560 A | 11/1993 | Palazzolo ...................... 82/46 |
| 5,617,768 A | 4/1997 | Palazzolo ...................... 82/47 |
| 6,228,317 B1 | 5/2001 | Smith et al. ................. 264/521 |
| 6,451,243 B1 | 9/2002 | Takada et al. ............... 264/530 |

* cited by examiner

Primary Examiner—Michael C Miggins
(74) Attorney, Agent, or Firm—Knoble, Yoshida, & Dunleavy, LLC

(57) ABSTRACT

A dimensionally-stable, injection-molded portion of a blow molded intermediate article is engaged by a conveyance mechanism of a trimmer to controllably drive the intermediate article within the trimmer to permit accurate and high speed severing of the injection molded portion and moil from a blown finish container body. An injection-molded, closed end preform is provided having a neck finish with an internal and/or external peripheral drive surface. The preform is utilized to form an intermediate article including a container body and moil. The injection-molded neck portion of the intermediate article remains substantially unchanged from its as-manufactured preform condition and provides a dimensionally stable surface for use in driving and rotating the intermediate article within the trimmer.

15 Claims, 13 Drawing Sheets

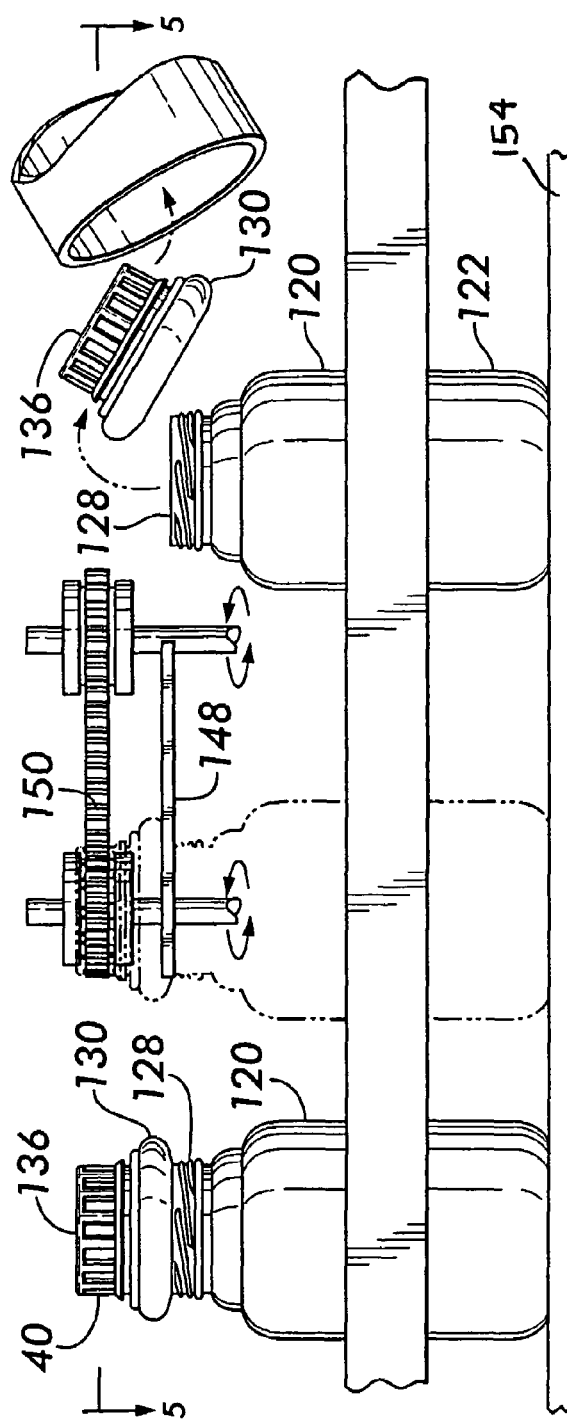
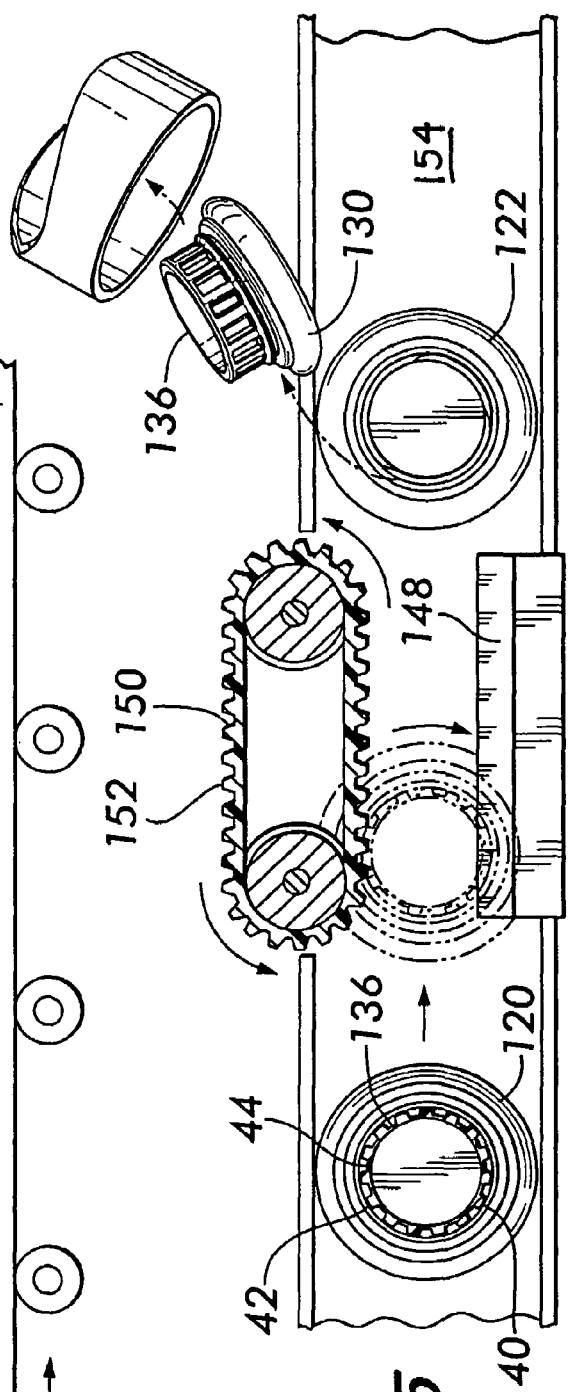
FIG. 4
FIG. 5

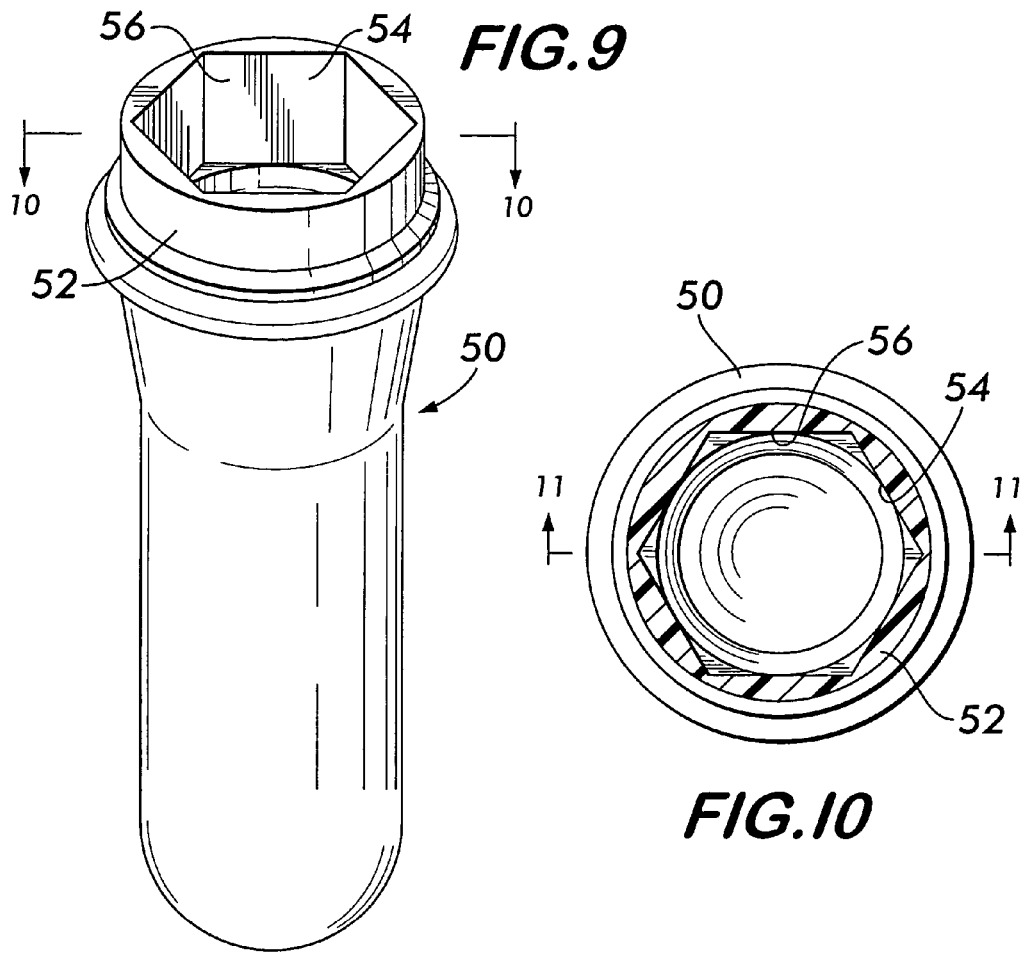
FIG. 9
FIG. 10
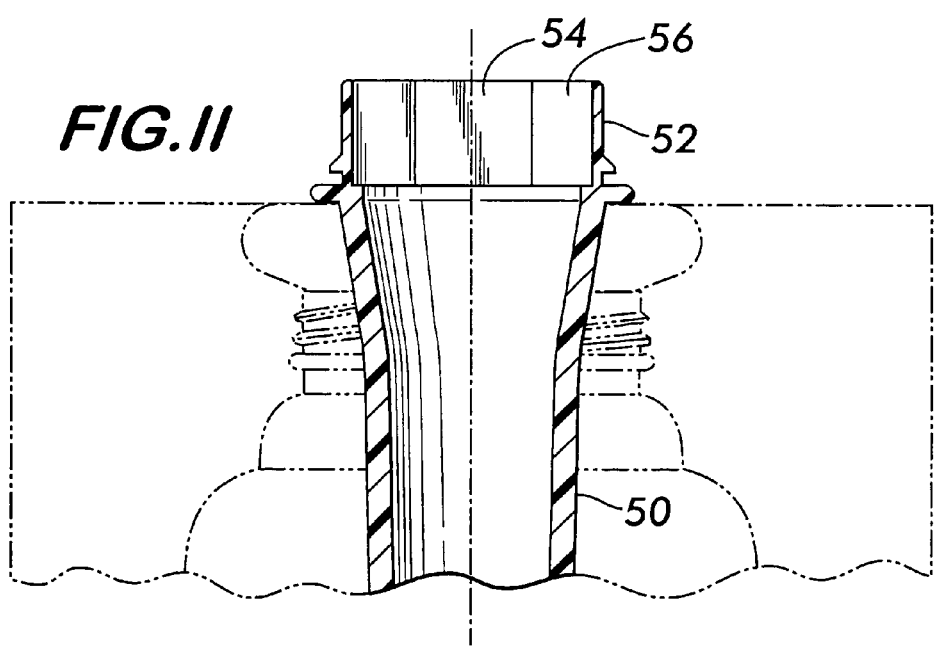
FIG. 11

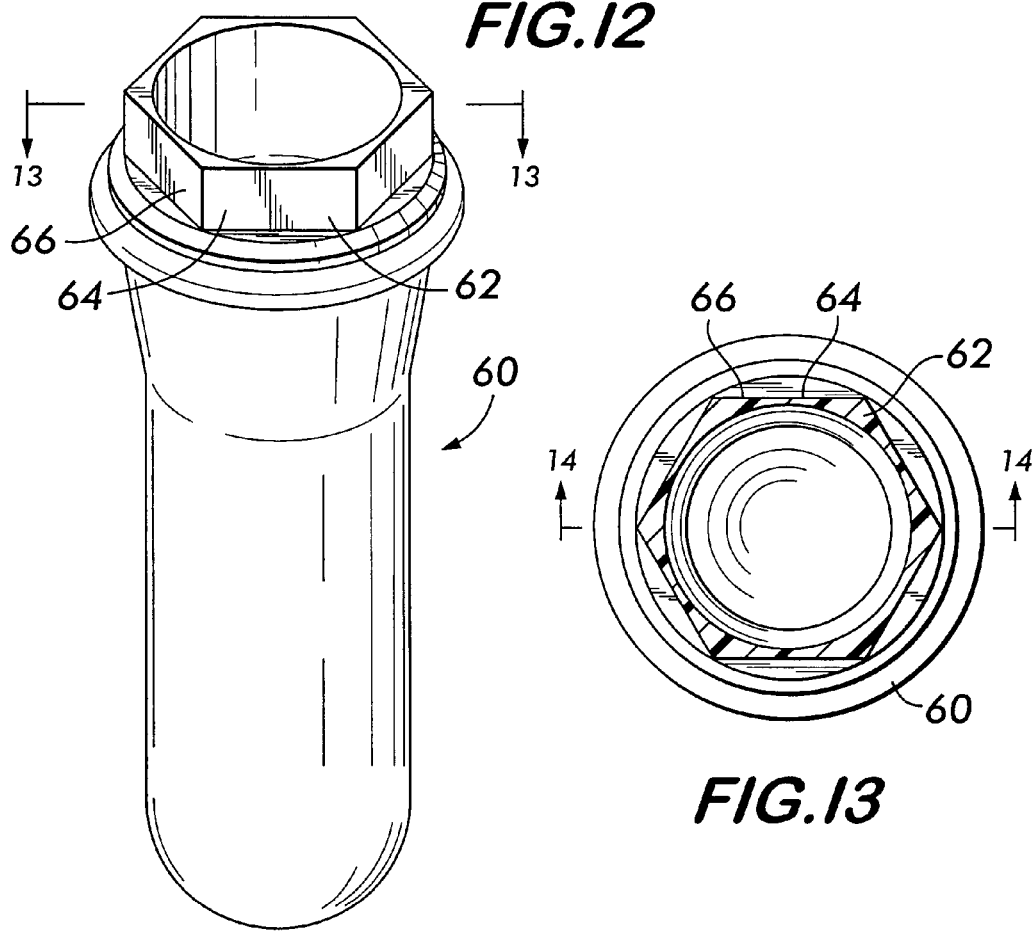
FIG.12
FIG.13
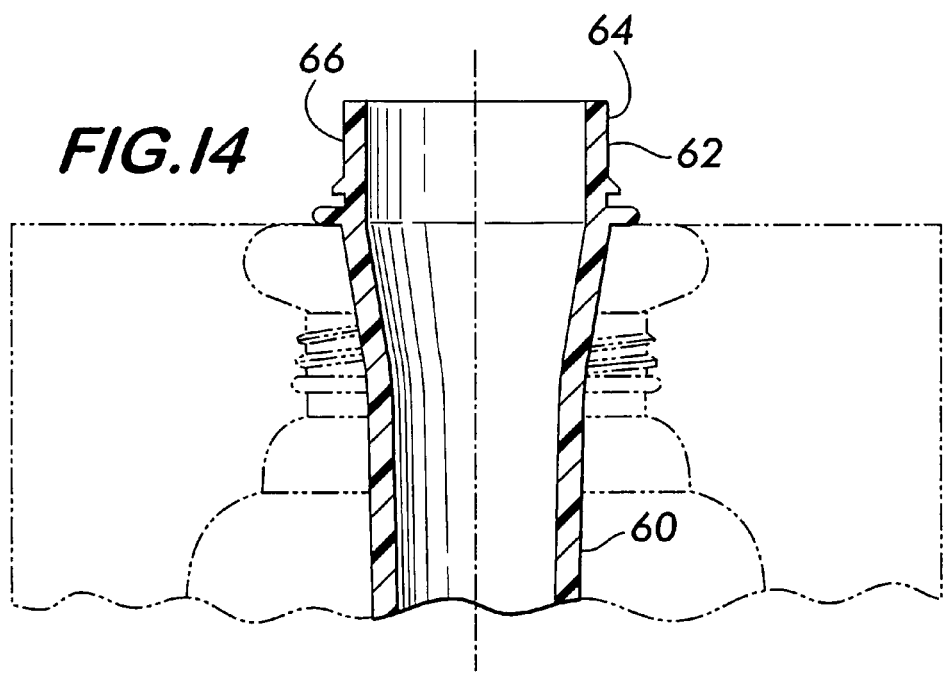
FIG.14

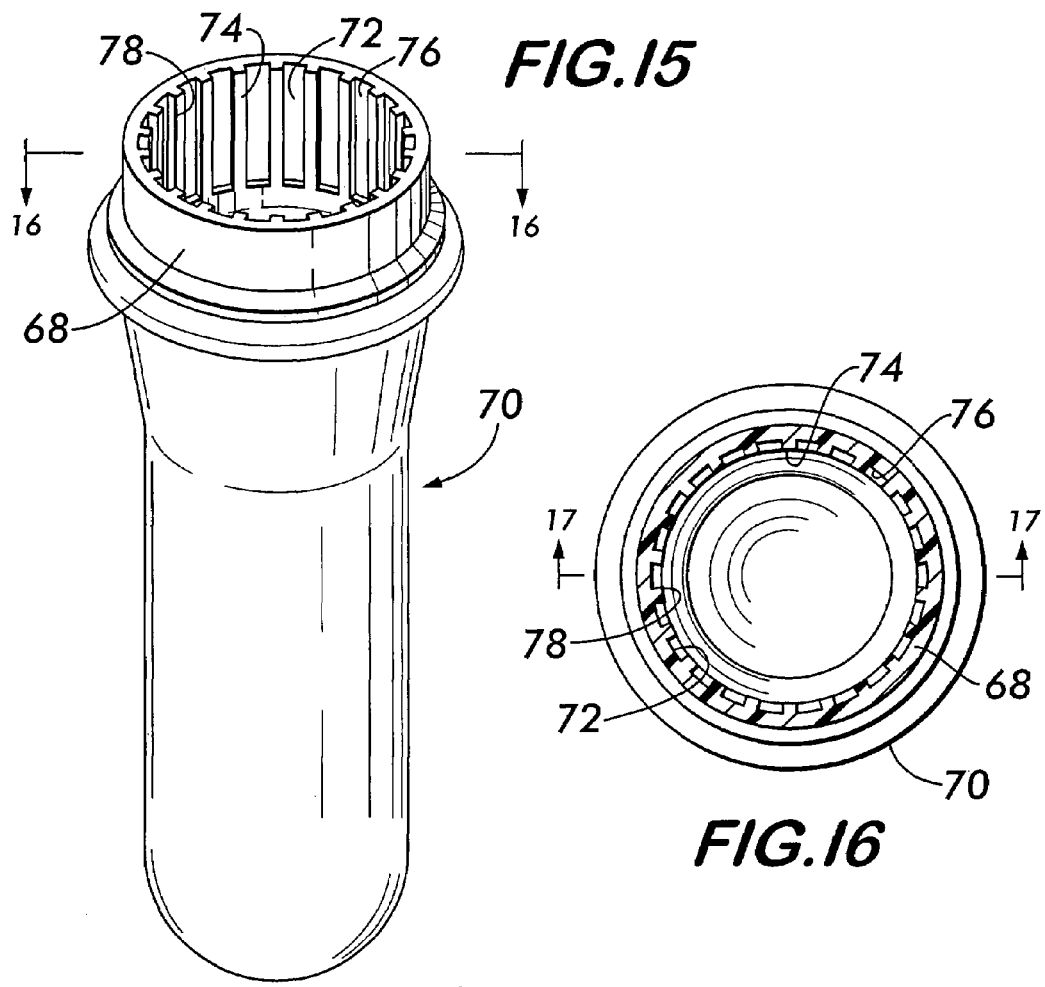
FIG.15
FIG.16
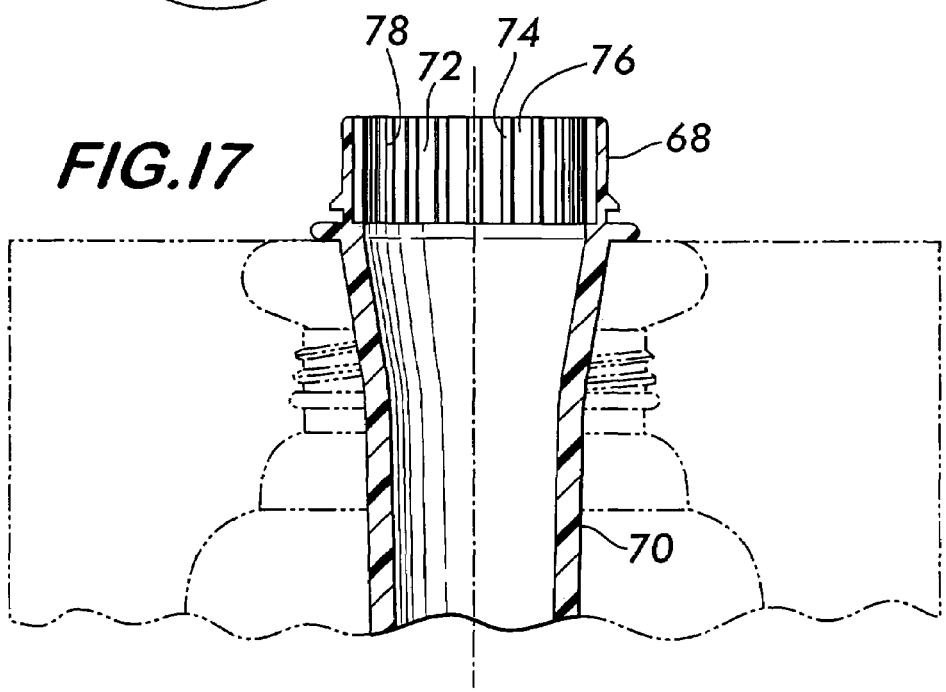
FIG.17

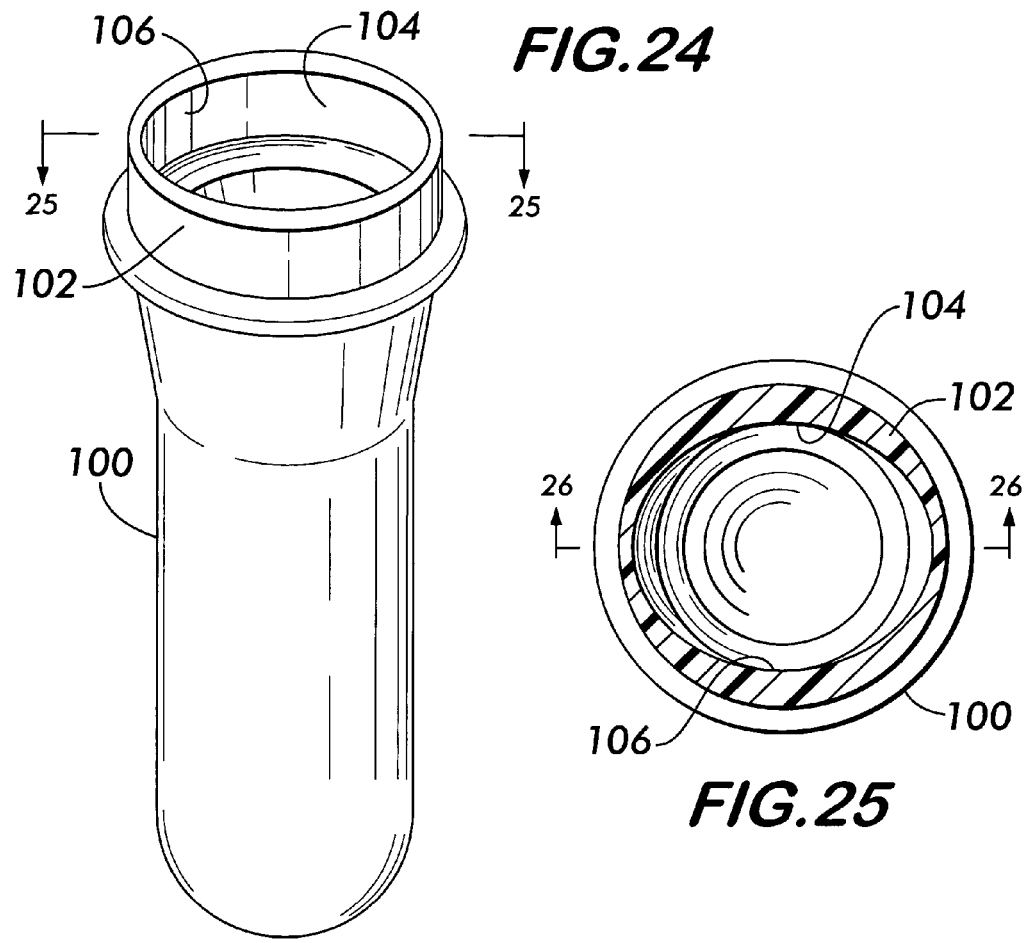
FIG.24
FIG.25
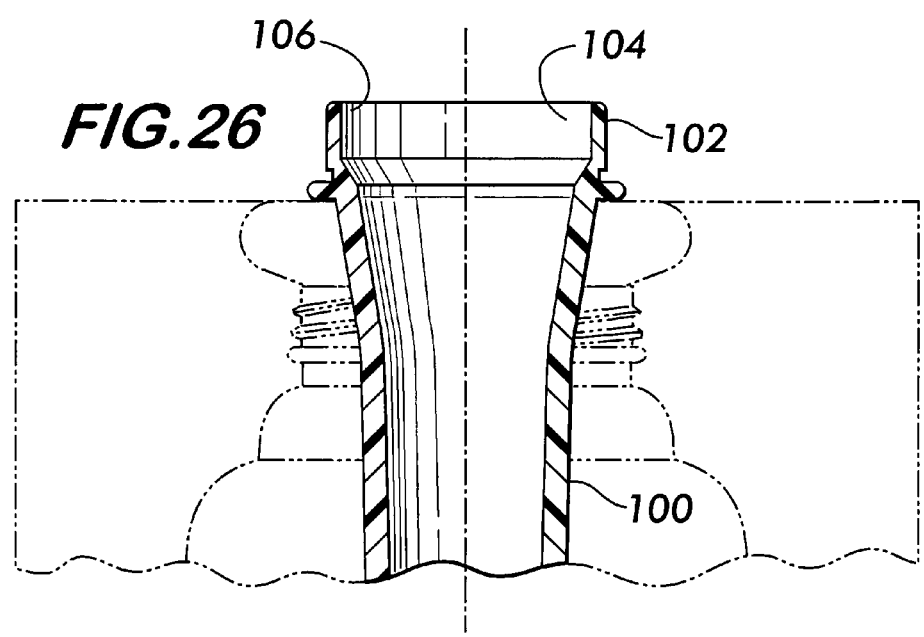
FIG.26

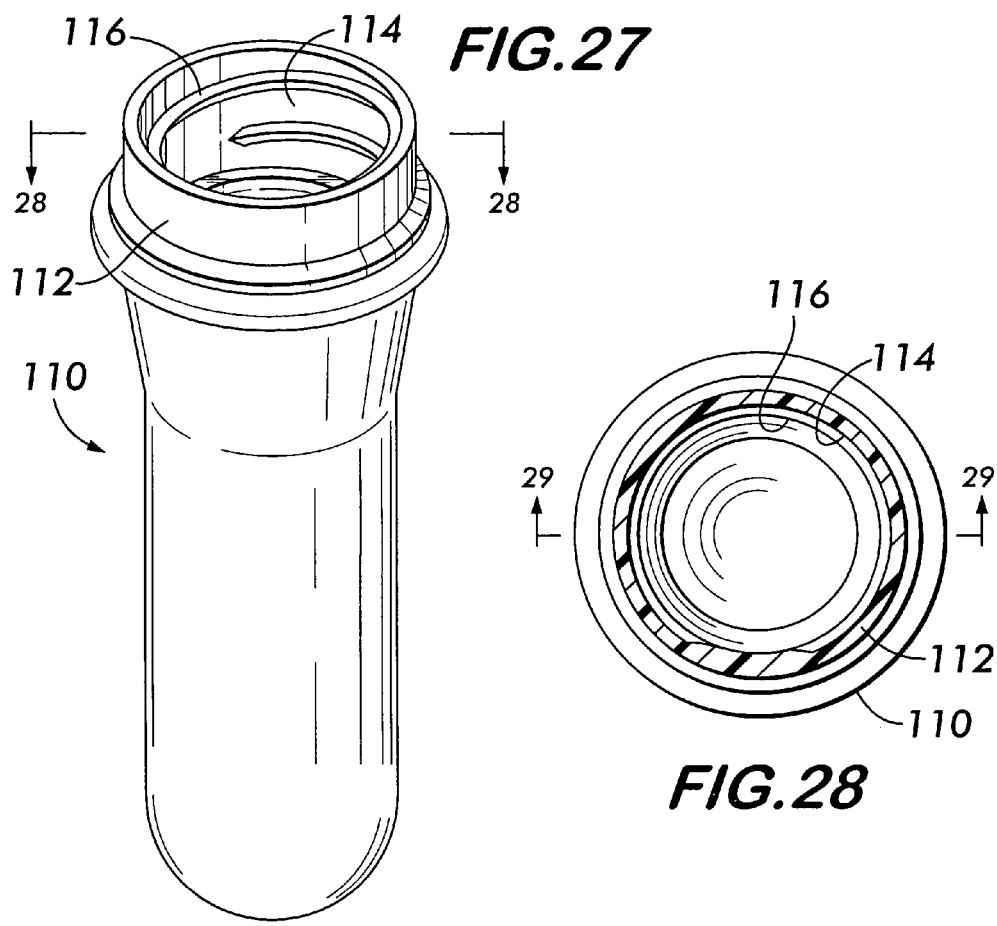
FIG.27
FIG.28
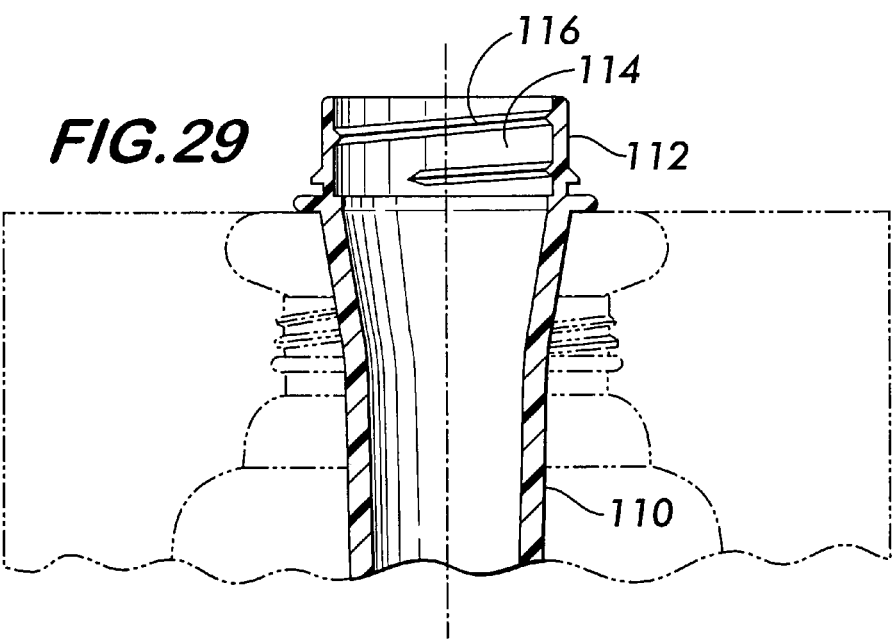
FIG.29

PREFORM, INTERMEDIATE ARTICLE AND METHOD FOR MANUFACTURING A BLOWN FINISH CONTAINER

CROSS REFERENCE TO RELATED APPLICATION

The present application is a divisional of application Ser. No. 10/034,410 filed on Dec. 27, 2001 now U.S. Pat. No. 6,814,923.

FIELD OF THE INVENTION

The present invention relates to the manufacture of plastic blow-molded containers having blown finishes, and more particularly, the present invention relates to an injection molded preform, blow-molded intermediate article made from the preform, and method for efficiently displacing, conveying, controlling, and/or rotating intermediate articles within spin trimming machines in a manner which provides improvements in trim consistency and quality.

BACKGROUND OF THE INVENTION

In the manufacture of blow-molded plastic bottles for containing liquids, such as beverages, it is customary to utilize an injection-molded preform having an injection-molded, narrow-mouth, threaded finish which ultimately forms the threaded finish of the container blown from the preform. The preforms may be injected molded from a variety of desirable plastic materials, such as polyethylene terephythalate (PET). During blow molding, only the body of the preform is expanded, and the injection molded finish is unchanged, remaining in its as-manufactured condition.

Injection molding is a more accurate molding technique in comparison with blow molding. Thus, injection-molded articles are manufactured within tighter tolerances than blow molded articles.

As disclosed in U.S. Pat. No. 6,228,317 assigned to Graham Packaging Company, L.P., assignee of the present application, injection molded preforms have been utilized in the manufacture of hot-fillable PET containers having blown finishes. To this end, the sidewall portion of an injection molded preform is blow molded to form a blown container having a blown finish and a blown moil/accommodation portion projecting from the blown finish. The intermediate article is then conveyed through trimming apparatus to sever the moil portion, which includes an integral injection molded finish, from the blown finish of the container thereby providing a blown container having a blown finish. The severed moil portions and integral injection molded finishes are collected, re-ground, and recycled.

As disclosed in the above referenced '317 patent, containers made by such a process include hot-fillable and/or retortable wide-mouth jars which have blown threaded finishes and which are utilized to package viscous products, such as, applesauce, spaghetti sauce, relish, pickles, beets, baby foods, sauerkraut, jelly, mayonnaise, and salad dressings to name a few. Other examples of blown finish containers made from injection molded preforms are disclosed in U.S. Pat. No. 4,665,682 issued to Kerins et al.; U.S. Pat. No. 4,618,515 issued to Collette et al.; and U.S. Pat. No. 4,576,843 and U.S. Pat. No. 4,496,064 issued to Beck et al.

Typically, the blown moil portions of intermediate articles have a pair of longitudinally-spaced outwardly extending projections which define a circumferential inset groove therebetween. See, for instance, the disclosure provided by the above referenced '317 patent. A drive belt of a trimming machine seats within the groove in the moil portion and conveys, drives and/or rotates the intermediate article within the trimming machine. Thus, as the drive belt advances the intermediate article through the trimming machine, the intermediate article is spin trimmed by a blade or the like which severs the moil portion from the container body. Examples of spin trimmers, moil structures with grooves, and trimmer conveyance mechanisms are disclosed in U.S. Pat. Nos. 4,305,904 and 4,361,531 issued to Black; U.S. Pat. No. 3,675,521 issued to Ziegler; U.S. Pat. Nos. 4,876,930 and 4,445,406 issued to Thatcher; and U.S. Pat. No. 5,257,560 issued to Palazzolo.

Although the above referenced patents disclosing injection molded preforms, blown intermediate articles, and/or methods of manufacturing, conveying and/or trimming containers are satisfactory for their intended purposes, there is a need for improving the handling and control of intermediate articles conveyed within trimming apparatus to improve the trim consistency and trim quality of blown finish containers. To this end, a desirable trimmer drive/conveyance mechanism should positively engage and control an intermediate article at a location possessing greater dimensional stability than the blown moil portion of the intermediate article so that the intermediate article can be conveyed with greater precision and at greater speeds. In addition, it is desirable for the cost of manufacturing blown finish containers to be reduced by decreasing the size of moil portions, thereby reducing the required amount of regrind reprocessing and costs associated therewith. Further, it is desirable to accurately trim the articles to reduce wear and tear of trimming devices, such as blades and the like, thereby increasing the life of the trimming devices and reducing the need for trimmer equipment downtime to replace worn blades. Still further, it is desirable for the accurately conveyed articles to permit the practical use of alternate cutting, trimming, and abrading technologies including ultrasonic, laser and like technologies.

OBJECTS OF THE INVENTION

With the foregoing in mind, a primary object of the present invention is to provide a commercially satisfactory blown-finish container having a uniformly and precisely severed peripheral upper edge which ensures proper sealing interaction with a closure.

Another object of the present invention is to provide a high speed precision method of conveying an intermediate article within a spin trimmer to enhance trim consistency and quality while achieving high rates of throughput.

Still another object of the present invention is to provide a preform and intermediate article having an injection molded drive surface which inherently provides improved dimensional stability so that an intermediate article can be conveyed with precision relative to a trimming device to thereby reduce wear and tear of the trimming device and increase the life of the trimming device.

A further object of the present invention is to provide a method of manufacturing a blown finish container which enables commercially acceptable hot fillable and retortable wide-mouth and/or narrow mouth plastic containers to be produced by means of high speed manufacturing equipment in an economical manner that ensures consistent quality and performance.

SUMMARY OF THE INVENTION

More specifically, according to one aspect of the present invention, a method is provided for displacing an intermediate article within a trimming machine during the manufacture of a blown-finish, blow molded plastic container. Preferably, the intermediate article has a hollow blow-molded container body with a blown annular finish, a blown accommodation portion projecting from the blown finish, and an injection-molded annular neck portion projecting from the accommodation portion and defining an open top of the intermediate article. The intermediate article is supplied to a trimming machine which has a drive mechanism for displacing, conveying, lifting, and/or rotating the intermediate article within the trimming machine. The drive mechanism of the trimming machine engages the inner peripheral surface, the outer peripheral surface, and/or the end wall of the injection molded neck portion to displace, convey, lift, control and/or rotate the intermediate article within the trimming machine during a moil severing operation. Thus, precise handling and control of the intermediate article is achieved by engaging the injection-molded neck portion of the intermediate article to provide improved trim consistency and quality.

According to another aspect of the present invention, a preform used to manufacture a blow molded plastic article in a blow mold is provided. The preform has a one-piece, injection-molded body with a tubular sidewall portion, a closed bottom end, and a neck portion defining an open end of the preform. The neck portion has an inner peripheral surface, an outer peripheral surface, and an end wall, and at least one of the surfaces provides a drive surface which is readily engagable for purposes of displacing, conveying, lifting, controlling and/or rotating the preform. For example, the drive surface can be either oval or multi-sided or the surface may have at least one recess or the surface may have alternating lugs and recesses. Thus, after the sidewall portion of the preform is blown into a blow molded article in the blow mold, a conveyance/drive mechanism is capable of engaging the drive surface and displacing the blow molded article within a trimming machine.

According to a further aspect of the present invention, an intermediate article formed during manufacture of a blow-molded plastic container is provided. The intermediate article includes an injection-molded neck portion defining an open top of the intermediate article and a hollow blow-molded container body having a sidewall, a closed base, and an annular blown finish. Preferably, the intermediate article also includes a blown accommodation portion which has one end projecting from the annular blown finish of the container body and an opposite end merging into the injection molded neck portion. The neck portion has an inner peripheral surface, an outer peripheral surface, and an end wall. One of the surfaces provides a drive surface which is readily engagable for purposes of displacing the intermediate article within a trimming machine to separate the container body from the accommodation portion and injection-molded neck portion. For example, the drive surface can be either oval or multi-sided or the surface may have at least one recess or the surface may have alternating lugs and recesses.

BRIEF DESCRIPTION OF THE DRAWINGS

The foregoing and other objects, features and advantages of the present invention should become apparent from the following description when taken in conjunction with the accompanying drawings, in which:

FIG. 4 is an elevational view of several intermediate articles being conveyed and trimmed in a trimming machine;

FIG. 5 is a cross-sectional view of the intermediate articles and trimming mechanism of FIG. 4 taken along lines 5-5;

FIG. 9 is a perspective view a second embodiment of a preform according to the present invention;

FIG. 10 is a cross-sectional view of the preform shown in FIG. 9 along line 10-10;

FIG. 11 is a cross-sectional view of the preform shown in FIG. 10 along line 11-11;

FIG. 12 is a perspective view a third embodiment of a preform according to the present invention;

FIG. 13 is a cross-sectional view of the preform shown in FIG. 12 along line 13-13;

FIG. 14 is a cross-sectional view of the preform shown in FIG. 13 along line 14-14;

FIG. 15 is a perspective view a fourth embodiment of a preform according to the present invention;

FIG. 16 is a cross-sectional view of the preform shown in FIG. 15 along line 16-16;

FIG. 17 is a cross-sectional view of the preform shown in FIG. 16 along line 17-17;

FIG. 24 is a perspective view a seventh embodiment of a preform according to the present invention;

FIG. 25 is a cross-sectional view of the preform shown in FIG. 24 along line 25-25;

FIG. 26 is a cross-sectional view of the preform shown in FIG. 25 along line 26-26;

FIG. 27 is a perspective view a eighth embodiment of a preform according to the present invention;

FIG. 28 is a cross-sectional view of the preform shown in FIG. 27 along line 28-28; and FIG. 29 is a cross-sectional view of the preform shown in FIG. 28 along line 29-29.

DETAILED DESCRIPTION OF THE PREFERRED EMBODIMENTS & METHOD

According to one aspect of the present invention, a preform is provided with a unique injection-molded neck having a drive surface that can be engaged by conveyance mechanisms within trimming apparatus in a manner which permits improved high speed handling of intermediate articles made from the preform. Another aspect of the present invention resides in the structure of an intermediate article which has a neck finish identical to the preform. Additionally, the present invention provides a method of conveying and/or rotating an intermediate article in a precisely controlled manner within trimming apparatus.

The preforms, intermediate articles, and method are preferably used in the manufacture of blow molded plastic containers having blown finishes which require a secondary trimming operation. Typically, the containers are wide-mouth plastic jars and are designed to withstand hot-fill processing conditions and/or retort sterilization processing conditions. Alternatively, the containers can be narrow-mouthed bottles which are typically used in packaging beverages, such as juice.

Detailed Description of the Preferred Preforms

Figure 1:
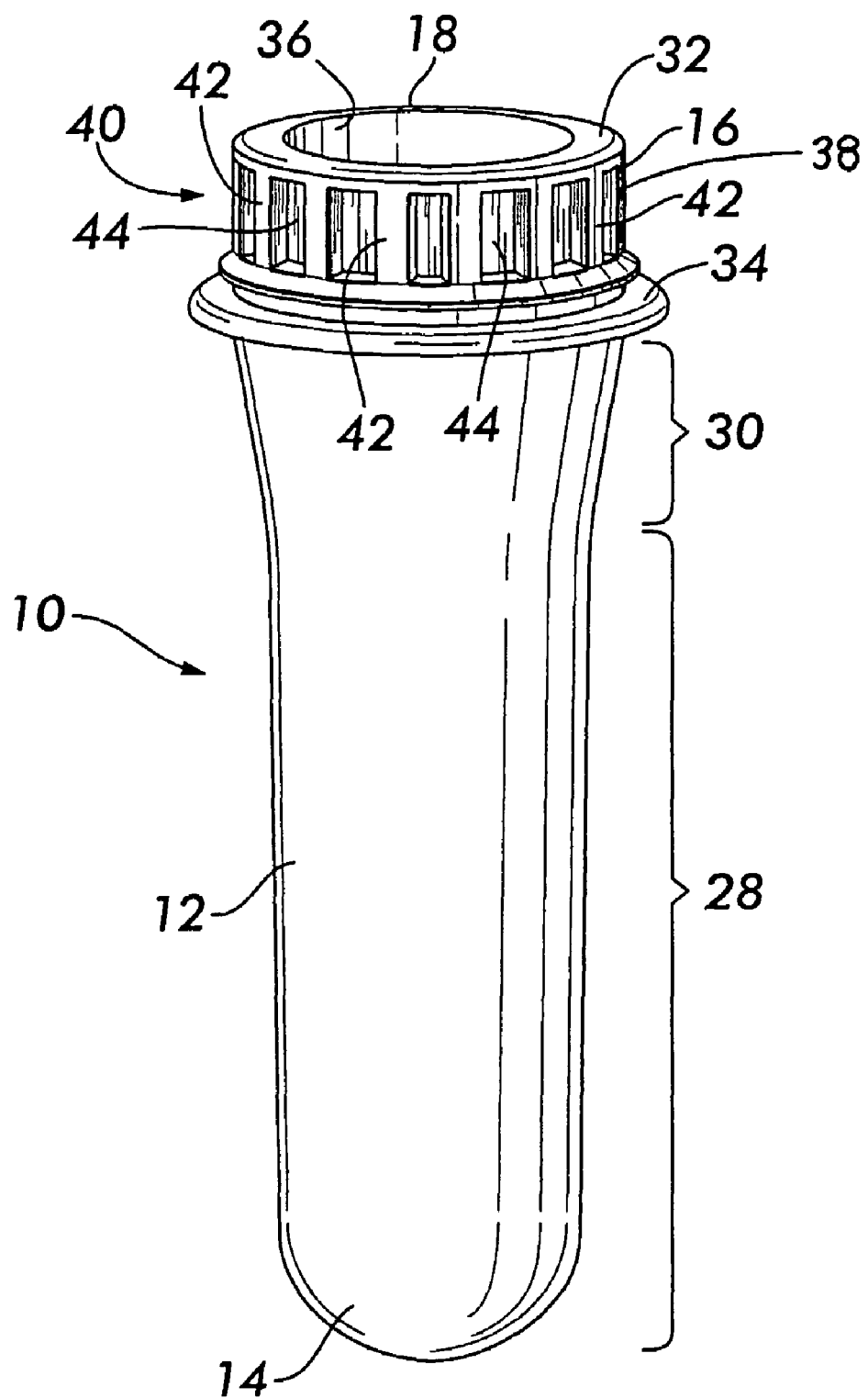
FIG. 1 is a perspective view of a first embodiment of an injection-molded preform according to the present invention.

FIG. 1 illustrates the structure of a first embodiment of a preform 10 according to the present invention. The preform 10 has a one-piece, injection-molded body with an elongate tubular sidewall 12, a closed bottom end 14, and a neck finish 16 defining an open end 18. The entire preform 10, as-manufactured, is injection molded of a thermoplastic material within precise tolerances so that each preform manufactured has substantially an identical and consistent structure. The thermoplastic material can be a single layer of PET, PEN, or like material, or it can be multi-layer including a vapor barrier material, a recycled scrap material, or other compatible material.

Figure 2:
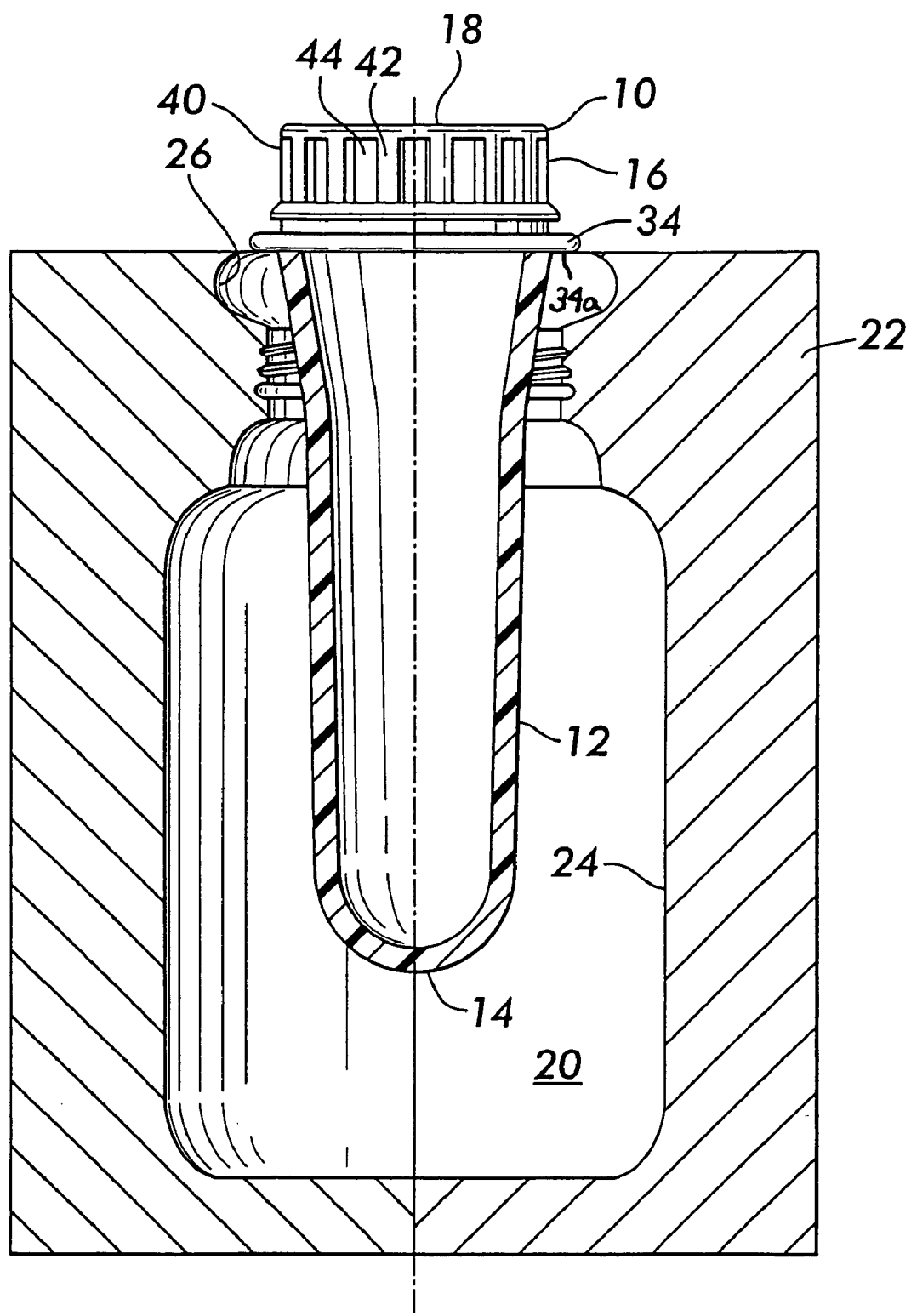
FIG. 2 is a schematic longitudinal view of the preform of FIG. 1 mounted within a portion of a blow mold cavity prior to blowing.

In use, the tubular sidewall 12 and closed bottom end 14 of the preform 10 are heated, located in a cavity 20 of a blow mold 22, and are inflated within the blow mold 22 into the shape defined by the blow mold cavity 20. Preferably, as illustrated in FIG. 2, a lower portion 24 of the cavity 20 provides the shape of a container body and an upper portion 26 defines the shape of a so-called moil, or accommodation portion. Thus, the sidewall 12 of the preform 10 includes a container body forming portion 28 and a moil forming portion 30.

The novel structure of the preform 10 is the injection molded neck finish 16. The neck 16 is not subject to expansion within the blow mold 22, and therefore, provides a dimensionally stable injection molded structure by which an intermediate article can be readily handled, transported and/or rotated with great control during trimming operations as will be discussed.

Structurally, the neck finish 16 of preform 10 has a top edge, or rim, 32 and an outwardly extending peripheral flange 34 which provides a mold seating surface 34a. See FIGS. 2 and 3. Inner and outer peripheral surfaces, 36 and 38, extend between the rim 32 and flange 34, and in this particular embodiment of the present invention, the outer surface 38 has an alternating array of lugs 42 and recesses 44 which provide an injection molded structure 40 having a shape capable of being releasably engaged by a conveyance/drive mechanism. Preferably, as illustrated, the lugs 42 are uniformly and circumferentially spaced apart by the recesses 44 so that the resulting configuration provides the outer surface 38 with an external gear-shaped transverse cross-section which can be releasably engaged and driven by a toothed belt drive (see FIGS. 4-6), a gear wheel drive (not shown), a gear-chuck mechanism (not shown) or the like.

Figure 18:
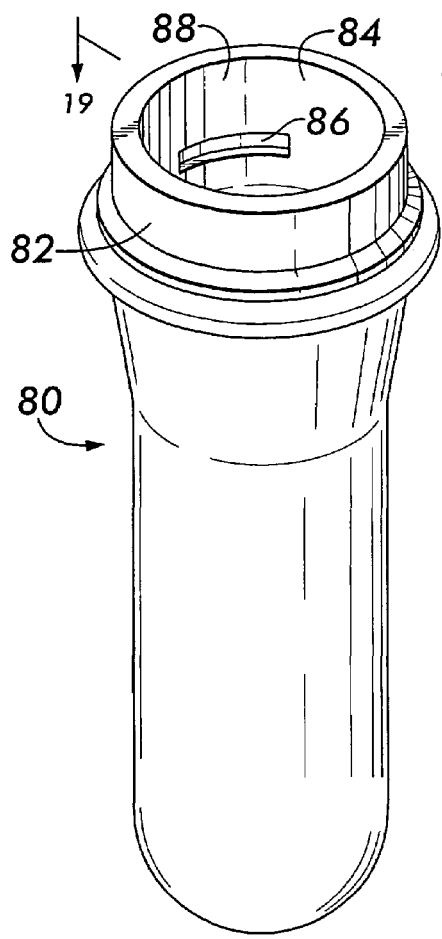
FIG. 18 is a perspective view a fifth embodiment of a preform according to the present invention.
Figure 19:
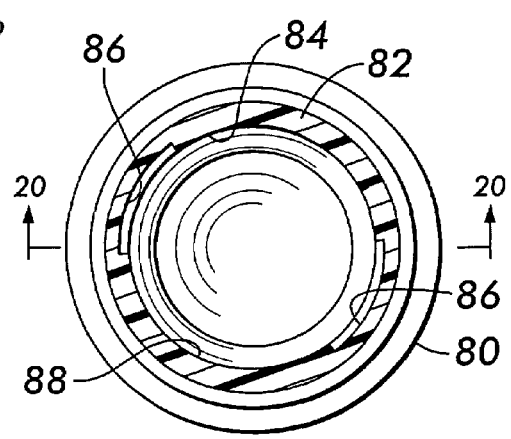
FIG. 19 is a cross-sectional view of the preform shown in FIG. 18 along line 19-19.
Figure 20:
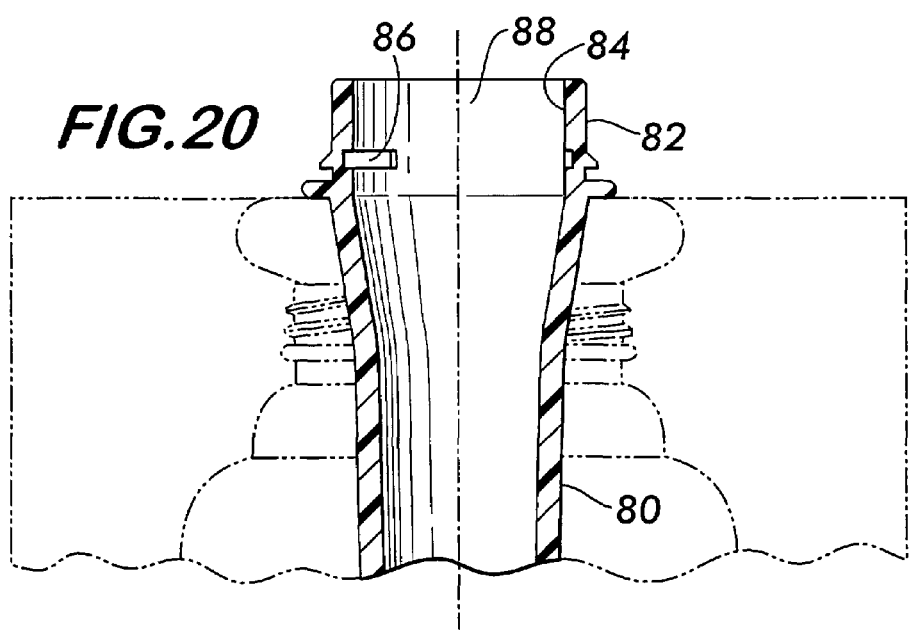
FIG. 20 is a cross-sectional view of the preform shown in FIG. 19 along line 20-20.
Figure 21:
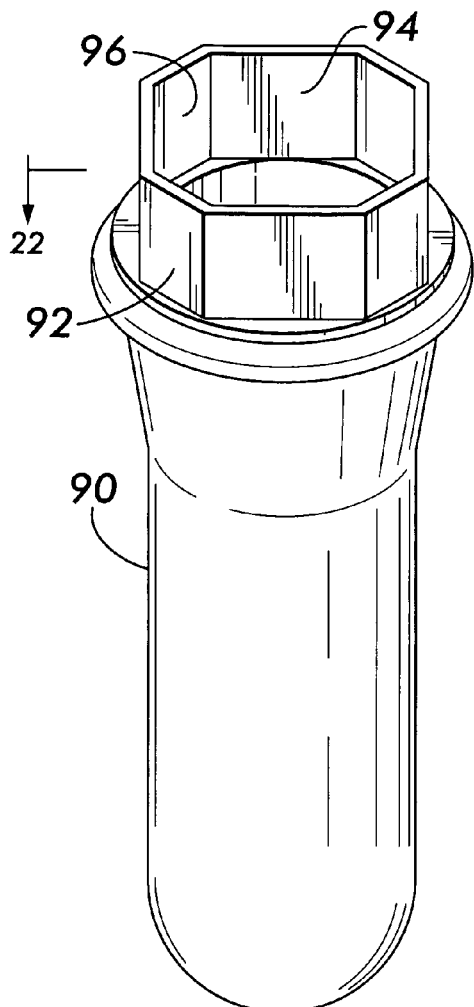
FIG. 21 is a perspective view a sixth embodiment of a preform according to the present invention.
Figure 22:
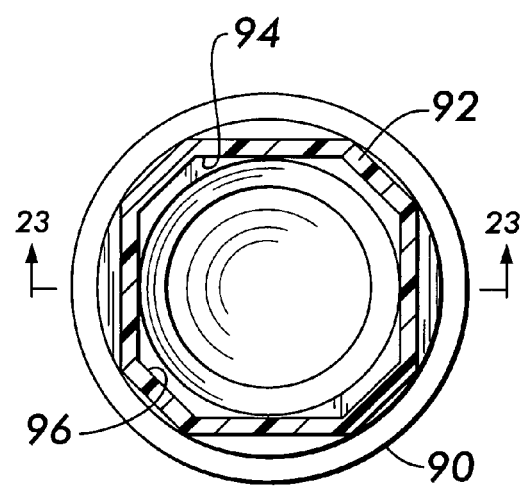
FIG. 22 is a cross-sectional view of the preform shown in FIG. 21 along line 22-22.
Figure 23:
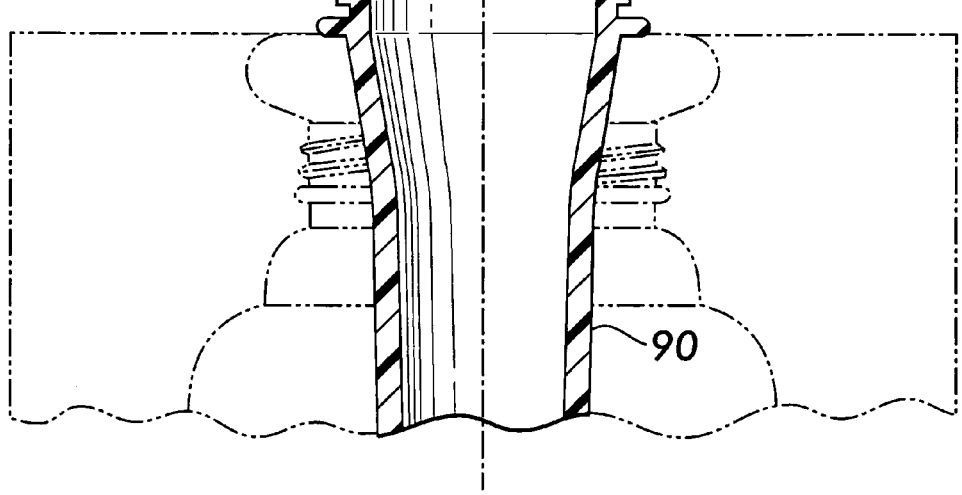
FIG. 23 is a cross-sectional view of the preform shown in FIG. 22 along line 23-23.

Other injection-molded drive surface configurations are also contemplated in accordance with the present invention and are capable of use in affording ready handling and control of intermediate articles within trimming apparatus. For example, the preform 50 illustrated in FIGS. 9-11 has a neck finish 52 with a six-sided inner periphery 54 which forms an internal drive surface 56; the preform 60 illustrated in FIGS. 12-14 has a neck finish 62 with a six-sided outer periphery 64 forming an external drive surface 66; the preform 70 illustrated in FIGS. 15-17 has a neck finish 68 with an inner periphery 72 which has an alternating array of lugs 74 and recesses 76 forming an internal drive surface 78; the preform 80 illustrated in FIGS. 18-20 has a neck finish 82 with an inner periphery 84 which has a pair of opposed recesses 86 forming an internal drive surface 88; the preform 90 illustrated in FIGS. 21-23 has a neck finish 92 with an inner periphery 94 which has a transverse cross section which is substantially square with truncated corners and which forms an internal drive surface 96; the preform 100 illustrated in FIGS. 24-26 has a neck finish 102 with an inner periphery 104 which has an oval transverse cross section forming an internal drive surface 106; and the preform 110 illustrated in FIGS. 27-29 has a neck finish 112 having a threaded inner periphery 114 providing an internal drive surface 116.

Detailed Description of the Preferred Intermediate Article

All of the above referenced preforms, 10, 50, 60, 70, 80, 90, 100 and 110, can be utilized to produce blow molded intermediate articles having a blown container body, a blown moil portion and an unmodified injection molded finish. For example, the intermediate article 120 illustrated in FIG. 7 discloses an example of an intermediate article which can be formed from the preform 10. For purposes of illustration, the structure of the container body illustrated in FIG. 7 is relatively plain; however, any container body configuration can be produced including those having flex panels, ribs, grooves, grips and other functional and ornamental features.

Figure 3:
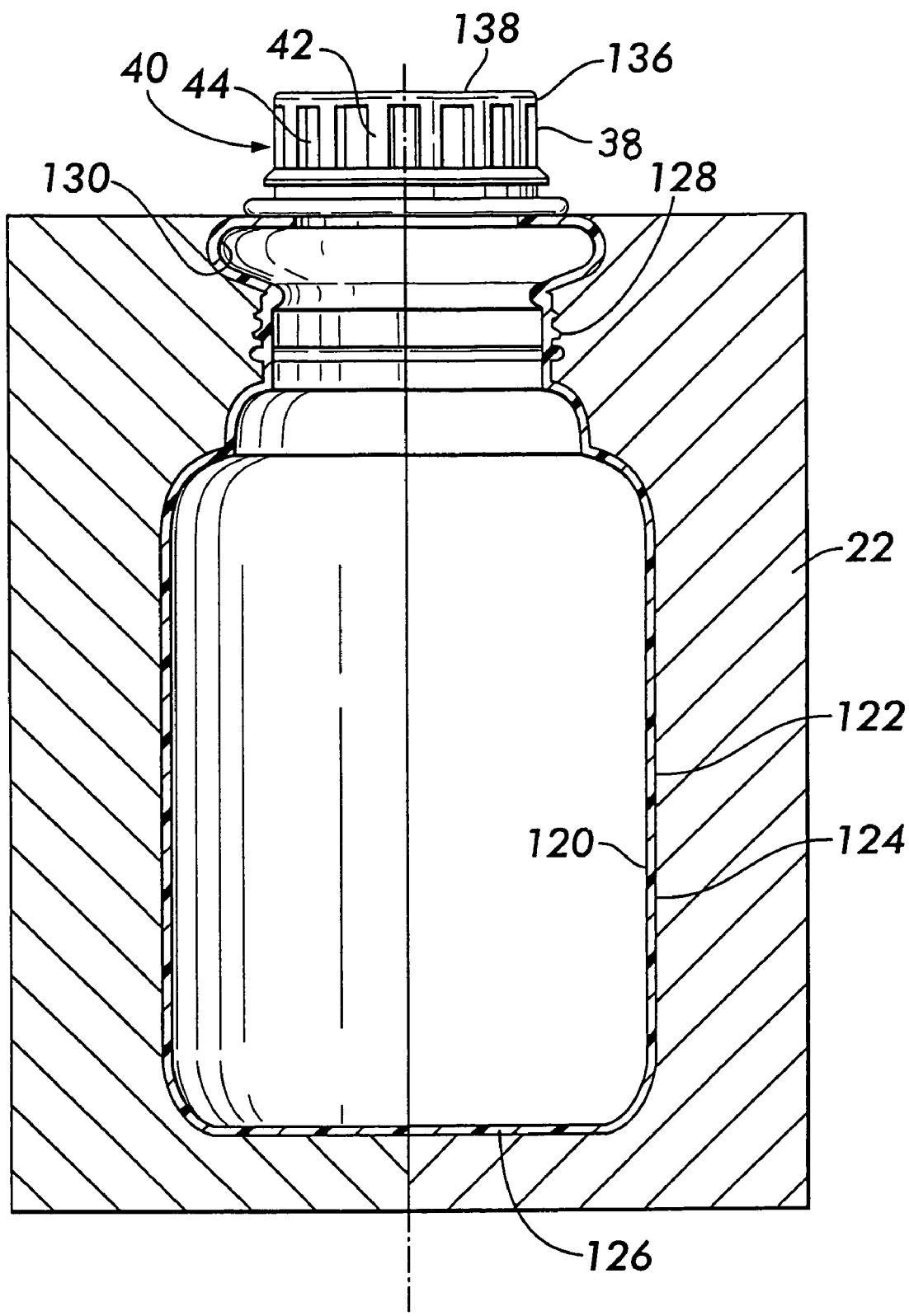
FIG. 3 is a schematic longitudinal view of an intermediate article located within the blow mold cavity illustrated in FIG. 3 after the preform has been inflated.
Figure 7:
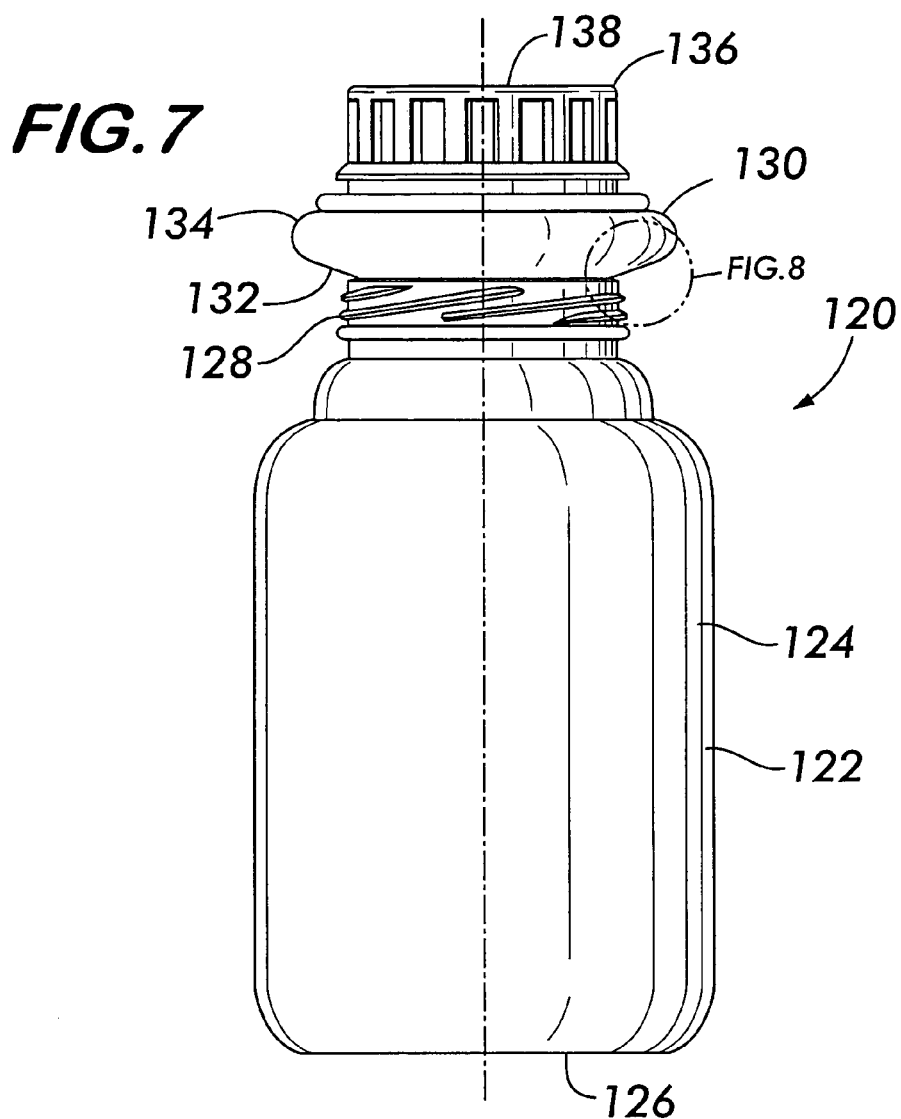
FIG. 7 is an elevational view of the intermediate article illustrated in FIG. 3.

As best illustrated in FIGS. 3 and 7, the intermediate article according to the present invention includes a hollow blow-molded container body 122 having a sidewall 124, a closed base 126, and an annular blown threaded finish 128. In addition, the intermediate article also includes an outwardly blown moil portion, or accommodation portion, 130 having one end 132 projecting integrally from the annular blown finish 128 and an opposite end 134 merging integrally into an injection-molded annular neck 136 which defines an open top 138 of the intermediate article 120.

One important aspect of the intermediate article according to the present invention is that its finish 136 remains unchanged from its as-manufactured preform condition so that the finish 136 provides a dimensionally stable surface which can be utilized to reliable manipulate, displace, convey and/or rotate the intermediate article within a spin trimmer. For example, the neck 136 of the intermediate article 120 illustrated in FIG. 7 is identical to the neck 16 of the preform 10 illustrated in FIG. 1, and therefore, has an outer peripheral drive surface formed by the alternating array of lugs 42 and recesses 44. Of course, any of the other preforms, 50, 60, 70, 80, 90, 100 and 110, can also be utilized to form an intermediate article having a selected one of the referenced internal and/or external drive surfaces 56, 66, 78, 88, 96, 106 and 116.

Another important aspect of the intermediate article according to the present invention is the reduction in size of the blown moil portion 130 as compared to moil configurations disclosed in the prior art. The moils disclosed by the prior art are relatively large and include an inwardly extending circumferential groove formed between upper and lower outwardly projecting moil bumper structures. For example, see the moil disclosed in U.S. Pat. No. 6,228,317. These prior art moils are designed to cooperatively receive and frictionally engage a drive belt for conveying and rotating the intermediate articles within spin trimmers. In contrast, the moil 130 of the present invention is solely provided as an outwardly convex wall which extends arcuately between moil end portions 132 and 134. The sole purpose of the moil 130 relates to the proper formation of the blown annular finish 128. Thus, the formation of a groove or the like is not required nor desired. Thus, the size of the moil 130 is reduced thereby reducing the amount of scrap material required to be collected and reground.

Figure 8:
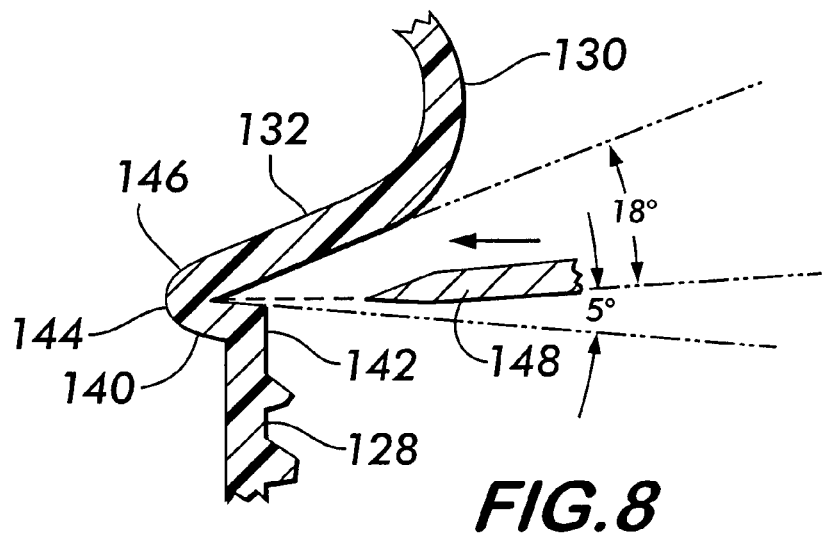
FIG. 8 is a detailed view of the rim of the blown finish and the moil portion of the intermediate article illustrated in FIG. 7.

As best illustrated in FIG. 8, the moil 130 of the intermediate article 120 extends outwardly beyond the peripheral extent of the blown finish 128 of the container body 122, and preferably, the blown finish 128 has an inwardly and upwardly tapered rim 140 from which the moil 130 projects. To this end, the rim 140 tapers upwardly as it extends inwardly from its outer peripheral edge 142 to its inner peripheral edge 144 so that the rim 140 provides a resilient container sealing surface when the moil 130 is severed from the rim 140. By way of example, the illustrated rim 140 tapers upwardly at an angle of about 5° from the horizontal and the lower end 146 of the moil 130 extends outwardly therefrom at an angle of approximately 18° relative to the horizontal so that a blade 148, or like severing element, is properly directed/funneled toward the proper severing location.

Detailed Description of the Preferred Method

Turning to the method of the present invention, the primary concept is to handle an intermediate article by engaging the injection-molded neck thereof which provides a dimensionally stable drive surface so that the intermediate article is precisely positioned and manipulated during a severing operation. The precise control of the intermediate article ensures consistent high quality trimming of the container bodies so that each container body has a rim without imperfections. In addition, precise conveying of the intermediate articles along a trimming blade will result in the blade having a longer useful life and will expand the interval between equipment downtime required to replace worn blades.

Figure 6:
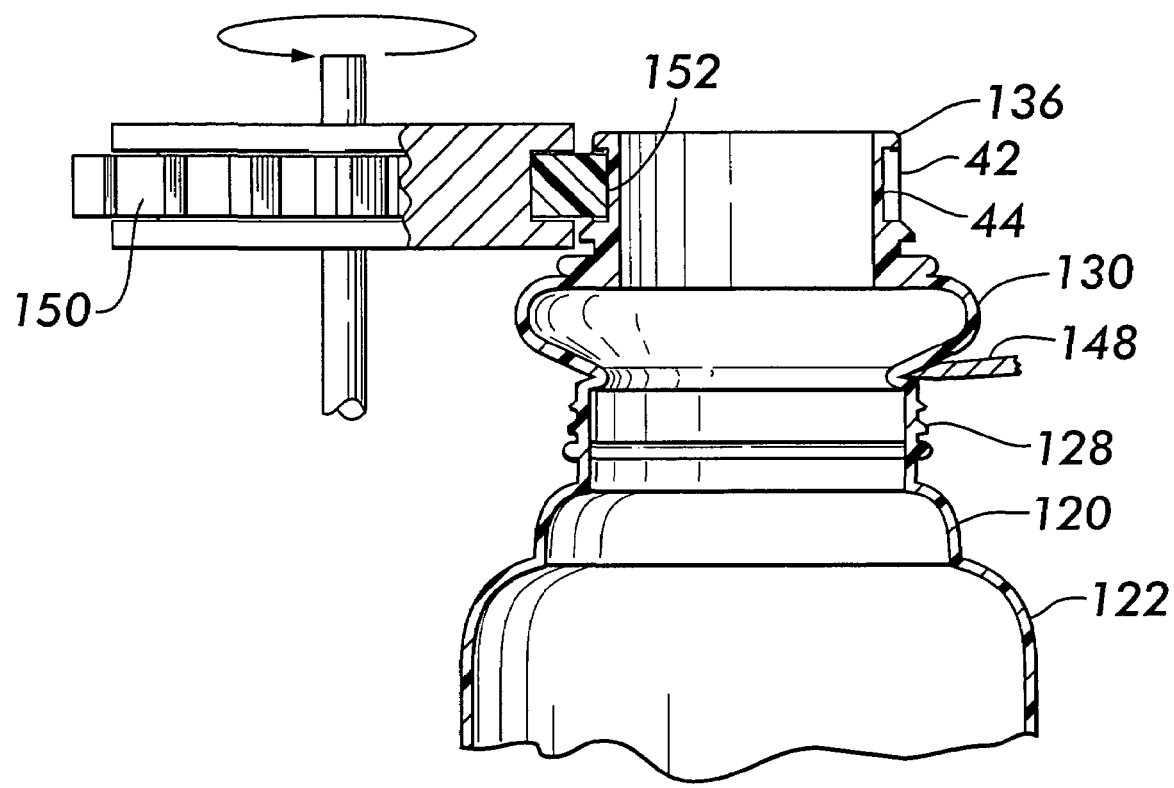
FIG. 6 is a partial cross-sectional view of an intermediate article being spin trimmed within the trimming machine illustrated in FIG. 4.

One contemplated conveyance mechanism according to the present invention involves the use of a tensioned tooth drive belt 150 illustrated in FIGS. 4-6. The drive belt 150 engages the external drive surface 40 of the intermediate article 120 to controllably drive and rotate the intermediate article 120 in contact with an elongate cutting blade 148. To this end, the teeth 152 of the drive belt 150 mate and interact with the recesses 44 formed in the drive surface 40 to positively rotate and advance the intermediate article 120 within the trimmer until the neck 136 and moil 130 are completely severed from the container body 122. Thereafter, the container body 122 has an accurately trimmed rim 140 which can reliably form a seal with a closure or the like, and the severed neck 136 and moil 130 are subject to regrind reprocessing and are recycled for use in making new preforms.

In the illustrated embodiment of a conveyance mechanism shown in FIGS. 4 and 5, the base 126 of each intermediate article 120 is seated on a lower horizontally extending conveyor belt 154 which advances the intermediate articles 120 into the trimming apparatus and transports the severed container bodies 122 out of the trimming apparatus. Thus, the toothed drive belt 150 rotates and drives the intermediate articles only adjacent the blade 148.

As an alternative to the illustrated conveyance mechanism and the use of a lower horizontally extending conveyor belt 154, a pair of opposed toothed drive belts can be utilized to simultaneously engage the necks of the intermediate articles to elevate, convey and positively control the movement of the intermediate articles into and/or within the trimming apparatus until the container bodies are severed from the moils. Simultaneous engagement of an injection molded neck by a pair of toothed opposed belts enhances control of the intermediate articles and increases the speed of conveyance of the intermediate articles. An example of the use of a pair of opposed belts is provided by the disclosure of U.S. Pat. No. 5,257,560 issued to Palazzolo. After the container bodies are severed from the moils, the container bodies are permitted to fall via a chute or the like and are collected for further processing. Thus, the conveyance mechanism according to the present invention includes those that accomplish one or more of picking, lifting, conveying, rotating and/or otherwise displacing the intermediate articles within trimming apparatus.

Another contemplated conveyance mechanism according to the present invention includes the use of a toothed gear wheel (not shown) about which the intermediate articles are conveyed and rotated in an arcuate path against an arcuate blade (not shown). To this end, the wheel has teeth which mate with the recesses 44 formed in the external drive surface 40 of the intermediate articles 120 and the rotation of the wheel thereby rotates and advances the intermediate articles 120 within the trimmer until the neck 136 and moil 130 are completely severed from the container body 122.

A further conveyance mechanism according to the present invention is a chuck/spindle mechanism (not shown) that extends over the neck finish and/or within the open mouth of an injection-molded neck finish. For example, with respect to preform 50 illustrated in FIG. 9, a chuck mechanism located directly above the neck finish 52 may be extended downwardly to positively engage the multi-sided inner periphery 54 of the neck finish 52. In addition, the chuck mechanism may include an outer section which simultaneously engages the circular outer periphery of the neck finish 52. Preferably, the chuck mechanism positively engages the neck finish via expandable detents, clamping devices, suction devices, friction fit devices, or the like so that movement of the intermediate article is positively and precisely controlled by movement of the chuck mechanism. A rotatable hex-shaped spindle of the chuck mechanism cooperatively engages the six-sided peripheral wall 54 of the neck 52 and, upon rotation, causes rotation of the neck finish 52 and intermediate article. Thus, the intermediate article may be picked, lifted, conveyed and/or rotated by the chuck/spindle mechanism within a trimmer.

A similar chuck/spindle mechanism is also capable of use for conveying and/or rotating an intermediate article having the injection molded neck finish 62 illustrated in FIGS. 12-14. In this case, the chuck mechanism would have a rotatable outer hex-shaped wall to cooperatively engage the hex-shaped outer drive surface 66 of the neck finish 62.

Other chuck/spindle mechanisms are also contemplated. For example, a gear-shaped chuck/spindle mechanism can be utilized to engage the inner peripheral surface 72 of the neck finish 68 which has an alternating array of lugs 74 and recesses 76. The associated intermediate article would be conveyed and rotated by conveyance and rotation of the gear-shaped chuck/spindle located within the mouth of the neck finish 68.

A chuck/spindle mechanism having a pair of opposed outwardly expandable detents could be utilized to positively engage the neck finish 82. To this end, the chuck/spindle mechanism is inserted into the open mouth of the neck finish 82 and expandable detents extend within the pair of recesses 86 located on the inner peripheral wall 84 of the neck finish 82. Thus, the neck finish 82 is positively grasped by the chuck/spindle mechanism and can be rotated by rotation of the chuck/spindle mechanism.

Further, chuck/spindle mechanisms of an oval shape, or of a substantially square shape having truncated corners can be utilized to cooperatively engage the inner peripheral walls, 94 and 104, of the neck finishes 92 and 102, respectively, and a threaded chuck/mechanism could be utilized to engage the threaded inner peripheral wall 114 of the neck finish 112.

Thus, the method of the present invention includes the step supplying a one-piece intermediate article to a trimming machine having any of the above referenced or similar conveyance mechanisms for positively controlling, conveying and/or rotating the intermediate articles adjacent a severing element. The intermediate article utilized in the method has a hollow blow-molded container body with an annular blown finish and an injection-molded neck defining an open top of the intermediate article. In addition, the intermediate article includes a blow-molded accommodation portion having one end projecting from the annular blown finish and an opposite end integrally merging into the injection molded neck. The method also includes the step of engaging the injection molded neck of the intermediate article with the conveyance mechanism of the trimming machine to controllably drive the intermediate article relative to a cutting element which may be a metal or graphite cutting blade, a laser, or an ultrasonic horn. Thus, the method further includes separating the injection molded neck and accommodation portion from the blow molded container body.

The method is utilized with an intermediate article having an injection molded neck with an internal drive surface, an external peripheral drive surface, or both. The drive surface includes, for example, multi-sided surfaces, oval surfaces, surfaces having at least a pair of detent receiving recesses, surfaces having an alternating array of lugs and recesses, and threaded surfaces. The drive surfaces enable an intermediate article to be positively engaged and controlled by a toothed belt, wheel or gear mechanism, chuck mechanism, spindle mechanism, detent mechanism or the like so that the intermediate article can be precisely conveyed and rotated adjacent a cutting blade or the like.

An additional step of the method is the injection molding of a preform having a sidewall portion, a closed bottom end, and a neck finish which defines an open end of the preform and which provides a drive surface. The tubular sidewall portion and closed bottom end of the preform is blow molded to form an intermediate article such that the injection molded neck finish remains substantially unchanged during the blow molding process to provide a dimensionally stable surface.

Thus, the present invention provides a preform structure, intermediate article structure, and method which enables precise trimming of containers having blown finishes. The use of a drive feature formed by injection molding processes provides a dimensionally stable and consistent surface enabling improved handling of intermediate articles within trimmers, particularly spin trimmers. The invention improves the quality of trimmed surfaces obtained and permits higher speed conveyance of intermediate articles through trimmer machines. In addition, the size of the moil can be reduced since the moil is not required to provide a blow molded drive surface. The reduced moil size results in the production of a cost-effective container since a reduction in regrind reprocessing is achieved.

While a preferred embodiment of a preform, intermediate article and method for conveying the intermediate article within trimmers has been described, various modifications, alterations, and changes may be made without departing from the spirit and scope of the present invention as defined in the appended claims.

The invention claimed is:

1. An intermediate article formed during manufacture of a plastic blow-molded container, comprising:
   a hollow blow-molded container body having a sidewall, a closed base, and an annular blown finish;
   a blown accommodation portion projecting from said annular blown finish; and
   an injection-molded neck portion projecting from said blown accommodation portion opposite said annular blown finish and defining an open top of the intermediate article;
   said injection-molded neck portion having an inner peripheral surface, an outer peripheral surface, and an end wall surface, at least a portion of a selected one of said surfaces of said neck portion being a releasably engageable non-circumferentially continuous surface that is non-threaded, for use in rotatably displacing said neck portion under positive control within a trimming machine to separate said container body from said blown accommodation portion and said injection molded neck portion;
   whereby said neck portion provides a dimensionally stable surface for rotatably manipulating said intermediate article during trimming, wherein one of said inner and outer peripheral surfaces of said neck portion defines a multi-sided transverse cross-section of said neck section.

2. An intermediate article according to claim 1, wherein said accommodation portion has an upper end depending from said injection molded neck portion and a lower end projecting from said annular blown finish, and wherein said accommodation portion extends outwardly between said upper and lower ends and consists of a continuous outwardly convex wall.

3. An intermediate article according to claim 2, wherein said blown finish has blown threads.

4. An intermediate article formed during manufacture of a plastic blow-molded container, comprising:
   a hollow blow-molded container body having a sidewall, a closed base, and an annular blown finish;
   a blown accommodation portion projecting from said annular blown finish; and
   an injection-molded neck portion projecting from said blown accommodation portion opposite said annular blown finish and defining an open top of the intermediate article;
   said injection-molded neck portion having an inner peripheral surface, an outer peripheral surface, and an end wall surface, at least a portion of a selected one of said surfaces of said neck portion being a releasably engageable non-circumferentially continuous surface that is non-threaded, for use in rotatably displacing said neck portion under positive control within a trimming machine to separate said container body from said blown accommodation portion and said injection molded neck portion;
   whereby said neck portion provides a dimensionally stable surface for rotatably manipulating said intermediate article during trimming, wherein one of said inner and outer peripheral surfaces of said neck portion is oval in transverse cross-section.

5. An intermediate article formed during manufacture of a plastic blow-molded container, comprising:
   a hollow blow-molded container body having a sidewall, a closed base, and an annular blown finish;
   a blown accommodation portion projecting from said annular blown finish; and
   an injection-molded neck portion projecting from said blown accommodation portion opposite said annular blown finish and defining an open top of the intermediate article;
   said injection-molded neck portion having an inner peripheral surface, an outer peripheral surface, and an end wall surface, at least a portion of a selected one of said surfaces of said neck portion being a releasably engageable non-circumferentially continuous surface that is non-threaded, for use in rotatably displacing said neck portion under positive control within a trimming machine to separate said container body from said blown accommodation portion and said injection molded neck portion;
   whereby said neck portion provides a dimensionally stable surface for rotatably manipulating said intermediate article during trimming, wherein one of said inner and outer peripheral surfaces of said neck portion has circumferentially alternating lugs and recesses.

6. An intermediate article according to claim 5, wherein said alternating lags are uniformly and circumferentially spaced apart by said recesses thereby forming a surface having a gear-shaped transverse cross-section.

7. A preform for use in manufacturing a blow molded plastic article in a blow mold, comprising:
   a one-piece, injection-molded plastic body having a tubular sidewall portion, a closed bottom end, and a neck portion defining an open end of the preform;
   said neck portion having an inner peripheral surface, an outer peripheral surface and an end wall surface;
   at least a portion of a selected one of said surfaces of said neck portion being a releasably engageable non-circumferentially continuous surface that is non-threaded, for use in rotatably displacing said neck portion under positive control within a trimming machine;
   whereby, after said sidewall portion of the preform is blown into a blow molded article in a blow mold, said neck portion provides a dimensionally stable surface for rotatably manipulating said blow molded article to enable rotational trimming to be accomplished, wherein one of said inner and outer peripheral surfaces of said neck portion defines a multi-sided transverse cross-section of said neck section.

8. A preform according to claim 7, wherein said releasably engageable surface of said neck portion is offset from a longitudinal axis of said preform and has at least one section extending transversely of said longitudinal axis such that said section is matingly engageable for use in rotating said preform about said longitudinal axis.

9. A preform according to claim 7, further comprising an annular flange which extends outwardly from said neck portion at a location between said sidewall portion and said outer peripheral surface of said neck portion.

10. A preform for use in manufacturing a blow molded plastic article in a blow mold, comprising:
    a one-piece, injection-molded plastic body having a tubular sidewall portion, a closed bottom end, and a neck portion defining an open end of the preform;
    said neck portion having an inner peripheral surface, an outer peripheral surface and an end wall surface;
    at least a portion of a selected one of said surfaces of said neck portion being a releasably engageable non-circumferentially continuous surface that is non-threaded, for use in rotatably displacing said neck portion under positive control within a trimming machine;
    whereby, after said sidewall portion of the preform is blown into a blow molded article in a blow mold, said neck portion provides a dimensionally stable surface for rotatably manipulating said blow molded article to enable rotational trimming to be accomplished,
    wherein said releasably engageable surface is non-concentric about said longitudinal axis.

11. A preform according to claim 10, wherein at least one of said inner and outer peripheral surfaces of said neck portion is oval in transverse cross-section.

12. A preform for use in manufacturing a blow molded plastic article in a blow mold, comprising:
    a one-piece, injection-molded plastic body having a tubular sidewall portion, a closed bottom end, and a neck portion defining an open end of the preform;
    said neck portion having an inner peripheral surface, an outer peripheral surface and an end wall surface;
    at least a portion of a selected one of said surfaces of said neck portion being a releasably engageable non-circumferentially continuous surface that is non-threaded, for use in rotatably displacing said neck portion under positive control within a trimming machine;
    whereby, after said sidewall portion of the preform is blown into a blow molded article in a blow mold, said neck portion provides a dimensionally stable surface for rotatably manipulating said blow molded article to enable rotational trimming to be accomplished,
    wherein one of said inner and outer peripheral surfaces surface of said neck portion has at least two circumferentially spaced opposed recesses.

13. A preform for use in manufacturing a blow molded plastic article in a blow mold, comprising:
    a one-piece, injection-molded plastic body having a tubular sidewall portion, a closed bottom end, and a neck portion defining an open end of the preform;
    said neck portion having an inner peripheral surface, an outer peripheral surface and an end wall surface;
    at least a portion of a selected one of said surfaces of said neck portion being a releasably engageable non-circumferentially continuous surface that is non-threaded, for use in rotatably displacing said neck portion under positive control within a trimming machine;
    whereby, after said sidewall portion of the preform is blown into a blow molded article in a blow mold, said neck portion provides a dimensionally stable surface for rotatably manipulating said blow molded article to enable rotational trimming to be accomplished, wherein one of said inner and outer peripheral surfaces of said neck portion has circumferentially alternating lugs and recesses.

14. A preform according to claim 13, wherein said lugs are uniformly and circumferentially spaced apart by said recesses forming a surface having a gear-shaped transverse cross section.

15. An intermediate article formed dining manufacture of a plastic blow-molded container, comprising:
    a hollow blow-molded container body having a sidewall, a closed base, and an annular blown finish;
    a blown accommodation portion projecting from said annular blown finish; and an injection-molded neck portion projecting from said blown accommodation portion opposite said annular blown finish and defining an open top of the intermediate article;

said injection-molded neck portion having an inner peripheral surface, an outer peripheral surface, and an end wall surface, at least a portion of a selected one of said surfaces of said neck portion being a releasably engageable non-circumferentially continuous surface that is non-threaded, for use in rotatably displacing said neck portion under positive control within a trimming machine to separate said container body from said blown accommodation portion and said injection molded neck portion;

whereby said neck portion provides a dimensionally stable surface for rotatably manipulating said intermediate article during trimming, wherein one of said inner and outer peripheral surfaces of said neck portion has at least two circumferentially spaced recesses.

* * * * *